(12) United States Patent
Carrejo et al.

(10) Patent No.: US 9,482,071 B2
(45) Date of Patent: Nov. 1, 2016

(54) SEAT APPARATUS AND METHOD

(71) Applicants: Nicholas Carrejo, Katy, TX (US);
Omar R. Espinoza, Katy, TX (US);
Sean L. Gaudette, Katy, TX (US)

(72) Inventors: Nicholas Carrejo, Katy, TX (US);
Omar R. Espinoza, Katy, TX (US);
Sean L. Gaudette, Katy, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 420 days.

(21) Appl. No.: 14/054,236

(22) Filed: Oct. 15, 2013

(65) Prior Publication Data

US 2015/0101823 A1   Apr. 16, 2015

(51) Int. Cl.
| | |
|---|---|
| *E21B 34/14* | (2006.01) |
| *E21B 34/06* | (2006.01) |
| *F16K 25/00* | (2006.01) |
| *F16K 15/04* | (2006.01) |
| *E21B 41/00* | (2006.01) |
| *E21B 34/00* | (2006.01) |

(52) U.S. Cl.
CPC ............. *E21B 34/063* (2013.01); *E21B 41/00* (2013.01); *F16K 15/04* (2013.01); *F16K 25/005* (2013.01); *E21B 2034/002* (2013.01)

(58) Field of Classification Search
CPC .......................... E21B 2034/002; E21B 34/14
See application file for complete search history.

(56) References Cited

U.S. PATENT DOCUMENTS

| | | | |
|---|---|---|---|
| 7,503,392 B2 | 3/2009 | King et al. | |
| 8,425,651 B2* | 4/2013 | Xu | B22F 1/025 75/245 |
| 8,479,808 B2* | 7/2013 | Gouthaman | E21B 33/1285 166/156 |
| 2010/0132954 A1 | 6/2010 | Telfer | |
| 2011/0284232 A1* | 11/2011 | Huang | E21B 21/103 166/317 |
| 2012/0012771 A1 | 1/2012 | Korkmaz et al. | |
| 2012/0048556 A1 | 3/2012 | O'Connell et al. | |
| 2012/0199341 A1 | 8/2012 | Kellner et al. | |
| 2013/0300066 A1* | 11/2013 | Xu | E21B 33/12 277/336 |
| 2014/0202708 A1* | 7/2014 | Jacob | E21B 33/12 166/376 |
| 2014/0216759 A1* | 8/2014 | Jacob | E21B 23/00 166/382 |

FOREIGN PATENT DOCUMENTS

WO    2005100743 A1    10/2005

OTHER PUBLICATIONS

International Search Report and Written Opinion, International Application No. PCT/US2014/055586, Date of Mailing Dec. 23, 2014, Korean Intellectual Property Office, International Search Report 5 pages, Written Opinion 5 pages.

* cited by examiner

*Primary Examiner* — William P Neuder
(74) *Attorney, Agent, or Firm* — Cantor Colburn LLP

(57) ABSTRACT

An apparatus and method for restricting fluid flow with a seat assembly. The seat is configured to go from a first position, in which it is adapted to engage a plug element, to a second position, in which the plug element passes through the seat. A second portion of the seat, and alternatively of a housing in which the seat is disposed, is formed of a disintegrable material. The second portion of the seat and housing comprising the disintegrable material are isolated from a fluid flow when engaged with the seat.

12 Claims, 3 Drawing Sheets

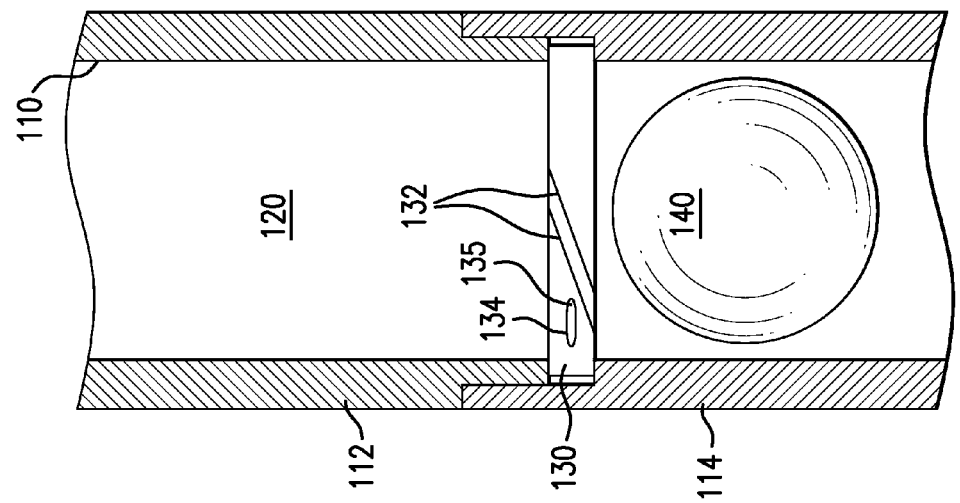
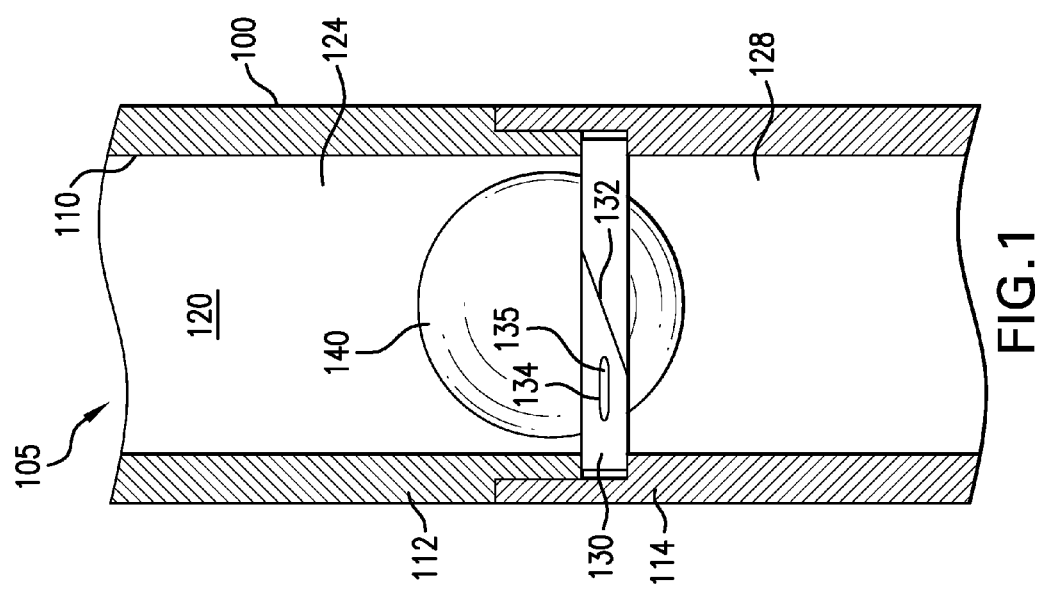

SEAT APPARATUS AND METHOD

BACKGROUND

Seat assemblies such as, for example, ball seats, are well known in a variety of industries. In downhole applications, ball seats are commonly used to regulate the flow of fluids and actuate downhole devices. While such systems work sufficiently for their desired purposes, these assemblies can interfere with subsequent operations, activities, production, etc. Physical removal of the seats, e.g., by fishing or intervention, can be difficult, costly, and time consuming. Therefore, the industry is receptive to advancements in seat assembly technology, particularly in designs that enable the seat and the various components thereof to be selectively removed in order to facilitate subsequent operations.

SUMMARY

Disclosed herein is a seating apparatus having a housing with a bore and a seat member. The seat member has a first position, in which it receives a plug element, and a second position, in which the plug element passes through the seat member. The seat member has a second portion formed at least partially from a disintegrable material responsive to a selected fluid. The second portion is substantially isolated from a fluid flow when the seat member is engaged with the plug element.

Also disclosed herein is an apparatus for restricting flow through multiple zones of a well conduit. The apparatus comprises multiple housings disposed in series within a well conduit. Each housing supports a seat member that is adapted to go from a first position supporting a plug element, to a second position. The seat member has a second portion, isolated from a fluid flow when engaged with the plug element, that is at least partially formed from a disintegrable material.

Also disclosed herein is a method for restricting fluid flow. A plug element is dropped into a well conduit and landed on a seat member. Upon completing the operation or a portion thereof, the seat member is influenced to go from a first position to a second position, thereby releasing the plug element. The second portion of the seat member is at least partially formed of a disintegrable material that is responsive to a selected fluid. When in the second position, the second portion of the seat member is exposed to the selected fluid and disintegrates.

BRIEF DESCRIPTION OF THE DRAWINGS

The following descriptions should not be considered limiting in any way. With reference to the accompanying drawings, like elements are numbered alike:

FIG. 1 is an illustration depicting a sectioned side view of a seating apparatus with a seating member in a first position, according to one embodiment;

FIG. 2 is an illustration depicting a sectioned side view of a seating apparatus with a seating member in a second position, according to the embodiment shown in FIG. 1;

DETAILED DESCRIPTION

Figure 3:
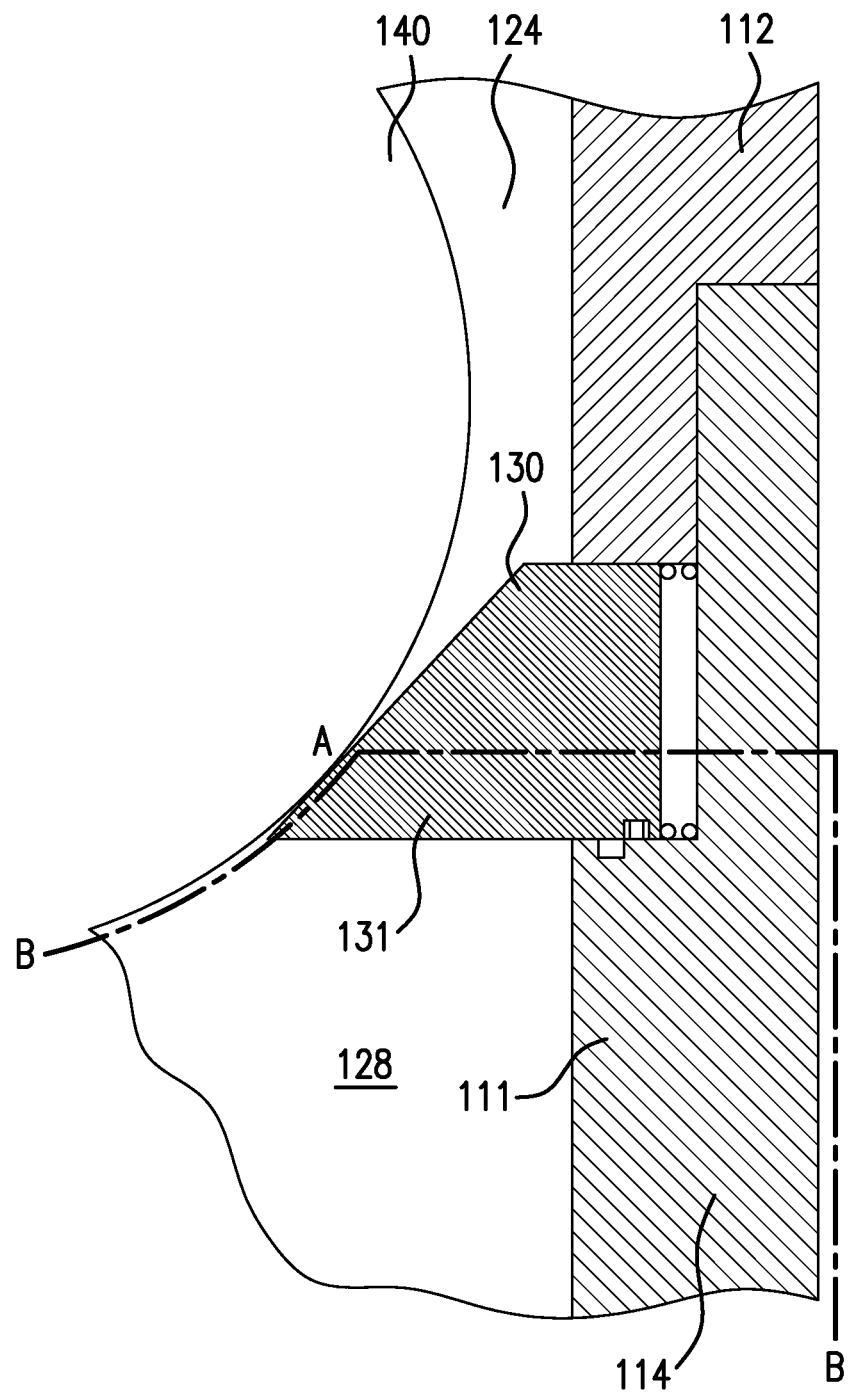
FIG. 3 is an illustration of a sectioned partial side view of a seating apparatus according to another embodiment.

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to a ball seat apparatus for use in well operations, whereas the advantages of the present disclosure as applied in a related field would be apparent to one having ordinary skill in the art and are considered to be within the scope of the present invention.

FIGS. 1 and 2 illustrate one embodiment of a seating assembly in accordance with the present disclosure. Seating assembly 105 is disposed in a well conduit 100. The seating assembly 105 comprises a housing 110 disposed in the well conduit 100, the housing having a bore 120 for conducting fluid flow through the well conduit. A seating member 130 is disposed in the housing 110. The seating member 130 is shown in a first position in FIG. 1, with a plug element 140 received thereon. With the plug element received by or engaged with the seating member 130, the bore 120 is effectively divided into a first portion 124 and a second portion 128. FIG. 2 shows the seating member 130 in a second position, the plug element 140 passing through the seating member when in the second position. With the plug element 140 no longer engaged with the seating member 130, the bore is no longer divided into first and second portions.

In some embodiments, the plug element 140 may be used in connection with multiple seat assemblies within a well conduit in succession. For example, the plug element may comprise a resilient material, wherein at least one of the seating apparatuses in a well conduit can achieve a first position and a second position, as described above. The seat member arranged in a first position and engages the plug element, restricting fluid flow. When the process requires, the seat member is biased or released to a second position, thereby disengaging the plug element. Upon releasing the plug element, the second portion of the seating apparatus, at least partially formed from a disintegrable material that is responsive to a selected fluid, is exposed to a fluid flow containing the selected fluid and substantially disintegrates, thereby removing the obstructing material from the well conduit. The plug element may then engage a downstream seating apparatus, repeating the process described above. Alternatively, the apparatus may comprise a plurality of plug members, each plug member corresponding to one of a plurality of seats in the well conduit. The plug members and seats may be sized to allow some plug elements to pass through a particular seat when in the first position.

The second portion 128 shown in FIG. 1 is formed, at least partially, from a disintegrable material which is responsive to a selected fluid. In this manner, the present disclosure provides a seating apparatus that is resilient while restricting flow through the well conduit, but which will quickly and controllably disintegrate once the seating apparatus is no longer required to restrict the fluid flow. Thus, the seating apparatus disclosed herein is configured to perform its intended purpose, without sacrificing performance. The seat assembly is then self-removed, dispensing with the need to mill out the seat assembly prior to conducting further operations in the well.

The disintegrable material may be activated, for example, by an acid or base solution. In some embodiments, the selected disintegrable material may adapted to disintegrate at a predictable rate when exposed to a selected fluid. In some embodiments the disintegrable material may comprise a nanomatrix metal composite containing a disintegrating agent. Examples of suitable materials and their methods of manufacture are given in in U.S. Pat. No. 8,425,651, "Nanomatrix metal composite," the entire contents of which are incorporated herein. These lightweight, high-strength and selectably and controllably degradable materials include fully-dense, sintered powder compacts formed from coated powder materials that include various lightweight particle cores and core materials having various single layer and multilayer nanoscale coatings. These powder compacts are made from coated metallic powders that include various electrochemically-active (e.g., having relatively higher standard oxidation potentials) lightweight, high-strength particle cores and core materials, such as electrochemically active metals, that are dispersed within a cellular nanomatrix formed from the various nanoscale metallic coating layers of metallic coating materials, and are particularly useful in borehole applications. Suitable core materials include electrochemically active metals having a standard oxidation potential greater than or equal to that of Zn, including as Mg, Al, Mn or Zn or alloys or combinations thereof. For example, tertiary Mg—Al—X alloys may include, by weight, up to about 85% Mg, up to about 15% Al and up to about 5% X, where X is another material. The core material may also include a rare earth element such as Sc, Y, La, Ce, Pr, Nd or Er, or a combination of rare earth elements. In other embodiments, the materials could include other metals having a standard oxidation potential less than that of Zn. Also, suitable non-metallic materials include ceramics, glasses (e.g., hollow glass microspheres), carbon, or a combination thereof. In one embodiment, the material has a substantially uniform average thickness between dispersed particles of about 50 nm to about 5000 nm. In one embodiment, the coating layers are formed from Al, Ni, W or Al2O3, or combinations thereof. In one embodiment, the coating is a multi-layer coating, for example, comprising a first Al layer, a Al2O3 layer, and a second Al layer. In some embodiments, the coating may have a thickness of about 25 nm to about 2500 nm.

In an exemplary embodiment, core material will be selected to provide a core chemical composition and the coating material will be selected to provide a coating chemical composition and these chemical compositions will also be selected to differ from one another. In another exemplary embodiment, the core material will be selected to provide a core chemical composition and the coating material will be selected to provide a coating chemical composition and these chemical compositions will also be selected to differ from one another at their interface. Differences in the chemical compositions of coating material and core material may be selected to provide different dissolution rates and selectable and controllable dissolution of powder compacts that incorporate them making them selectably and controllably dissolvable. This includes dissolution rates that differ in response to a changed condition in the wellbore, including an indirect or direct change in a wellbore fluid. In an exemplary embodiment, a powder compact formed from powder having chemical compositions of core material and coating material that make compact is selectably dissolvable in a wellbore fluid in response to a changed wellbore condition that includes a change in temperature, change in pressure, change in flow rate, change in pH or change in chemical composition of the wellbore fluid, or a combination thereof. The selectable dissolution response to the changed condition may result from actual chemical reactions or processes that promote different rates of dissolution, but also encompass changes in the dissolution response that are associated with physical reactions or processes, such as changes in wellbore fluid pressure or flow rate.

In one embodiment, the disintegrable material is a metal composite that includes a metal matrix disposed in a cellular nanomatrix and a disintegration agent. In an embodiment, the disintegration agent is disposed in the metal matrix. In another embodiment, the disintegration agent is disposed external to the metal matrix. In yet another embodiment, the disintegration agent is disposed in the metal matrix as well as external to the metal matrix. The metal composite also includes the cellular nanomatrix that comprises a metallic nanomatrix material. The disintegration agent can be disposed in the cellular nanomatrix among the metallic nanomatrix material. Unlike elastomeric materials, the components of the disintegrable anchoring system herein that include the metal composite have a temperature rating up to about 1200° F., specifically up to about 1000° F., and more specifically about 800° F.

The disintegration agent is included in the metal composite 200 to control the disintegration rate of the metal composite 200. The disintegration agent can be disposed in the metal matrix 214, the cellular nanomatrix 216, or a combination thereof. According to an embodiment, the disintegration agent includes a metal, fatty acid, ceramic particle, or a combination comprising at least one of the foregoing, the disintegration agent being disposed among the controlled electrolytic material to change the disintegration rate of the controlled electrolytic material. The disintegration agent can be a metal including cobalt, copper, iron, nickel, tungsten, zinc, or a combination comprising at least one of the foregoing. In a further embodiment, the disintegration agent is the fatty acid, e.g., fatty acids having 6 to 40 carbon atoms. Exemplary fatty acids include oleic acid, stearic acid, lauric acid, hyroxystearic acid, behenic acid, arachidonic acid, linoleic acid, linolenic acid, recinoleic acid, palmitic acid, montanic acid, or a combination comprising at least one of the foregoing. In yet another embodiment, the disintegration agent is ceramic particles such as boron nitride, tungsten carbide, tantalum carbide, titanium carbide, niobium carbide, zirconium carbide, boron carbide, hafnium carbide, silicon carbide, niobium boron carbide, aluminum nitride, titanium nitride, zirconium nitride, tantalum nitride, or a combination comprising at least one of the foregoing. Additionally, the ceramic particle can be one of the ceramic materials discussed below with regard to the strengthening agent. Such ceramic particles have a size of 5 µm or less, specifically 2 µm or less, and more specifically 1 µm or less. The disintegration agent can be present in an amount effective to cause disintegration of the metal composite 200 at a desired disintegration rate, specifically about 0.25 wt % to about 15 wt %, specifically about 0.25 wt % to about 10 wt %, specifically about 0.25 wt % to about 1 wt %, based on the weight of the metal composite.

FIG. 3 illustrates one embodiment of the seating apparatus disclosed herein, with a line B illustrating the extent of the second portion 128. The second portion may include any of the features, or surfaces thereof, of the seating apparatus that are not in communication with the first portion 124. Alternatively, the second portion may be drawn to exclude all features, or surfaces thereof, of the seating apparatus that are in communication with the first portion 124. In some embodiments, the second portion 128 may be selected to exclude the plug element 140 entirely, but may include a second portion of the seat member 131 and a second portion of the housing 111. For example, FIG. 3 illustrates the line B dividing a second portion of the bore 120 from a first portion, excluding the plug element 140. Line B further divides the seat member 130 and housing 110 on a plane that aligns with point A, which point indicates where the plug element 140 contacts the seat member 130.

The embodiments illustrated in FIGS. 1-3 provide a seating assembly 105 employing a radially expanding seating member 130. This configuration is similar to the seat assembly disclosed in U.S. Pat. No. 8,479,808, the contents of which are incorporated herein. FIGS. 1 and 2 show a sectioned view of the seating assembly 105 in a first position (FIG. 1) and a second position (FIG. 2). In a first position, the seat member provides an opening having a first diameter, which diameter corresponds to a size and shape of a plug element 140. In the illustrated embodiment, a shear screw 135 is arranged in a recess 134 and holds the seating member 130 in the contracted state of the first position.

Once the restriction of the flow is no longer necessary, the seating member 130 is biased or otherwise shifted to a second position. See FIG. 2. In the second position, the seating member 130 forms a larger diameter allowing the plug element 140 to drop. In the illustrated embodiment, this may be accomplished, for example, by causing shear screw 135 to fail by subjecting the seating apparatus to a predetermined pressure.

The illustrated embodiments of FIGS. 1-3 are exemplary only. As may be appreciated by those in the art, the present disclosure may be utilized with seating apparatuses in any number of configurations which allow the plug element to pass through the seat member upon completion of a process or step thereof. Such configurations include, for example, a seating apparatus in which the housing comprises a support member. The support member may be a fluid activated support member in communication with a chamber. The support member is influenced from the first position to a second position by subjecting the chamber to a selected pressure. The fluid activated support member may be operatively associated with the chamber being controlled, for example, by subjecting the chamber to a selected pressure. Other examples include a seating apparatus with a deformable seat and a seating apparatus with a seat member that partitions and divides to release the plug element.

Figure 4:
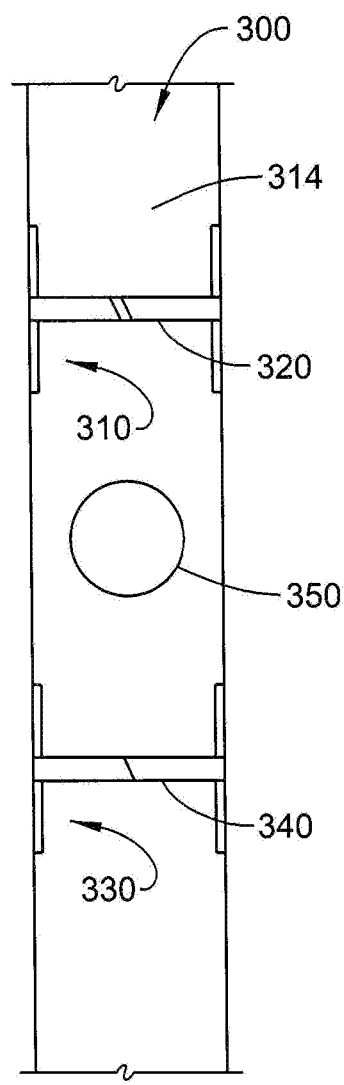
FIG. 4 depicts a plurality of seating members arranged in a well bore.

In accordance with an aspect of an exemplary embodiment depicted in FIG. 4, a seating apparatus 300 may include a first housing 310 arranged in a well conduit 314. First housing 310 has a first seat member 320 disposed therein. First seat member 320 is adapted to move from a first position to a second position. First seat member 320 has a second portion formed at least partially from a disintegrable material that is responsive to a selected fluid. At least a second housing 330 is arranged in well conduit 314 located downstream from first housing 310. Second housing 330 has a second seat member 340 disposed therein. Second seat member 340 is adapted to move from a first position to a second position. Second seat member 340 has a second portion formed at least partially from a disintegrable material that is responsive to a selected fluid. A first plug element 350 is adapted to be disposed into the bore to restrict fluid flow through well conduit 314 by engaging one or more of first seat member 320 and second seat member 340.

The system and method of the present disclosure has utility in the downhole environment, as discussed above, but will also be advantageous in any number of other applications, as may be appreciated by those in the art.

Within the downhole environment, the seating apparatus and method of the present disclosure may be used in any number of operations requiring flow to be diverted in a well conduit. For example, the system of the present disclosure may be useful in acid stimulation operations where current self-removing seating apparatus designs are not. Because the disintegrable material is used to form only those features exposed in the second portion of the seating apparatus, downstream of the acid flow being diverted into a formation, the seating apparatus of the present disclosure may employ disintegrable materials that would otherwise disintegrate in the presence of the acid.

The disclosure above describes exemplary embodiments of a seat assembly, illustrated as a ball seat assembly. Other embodiments may include any number of ball seats having multiple seat portions, flow paths, alignment planes, and shapes of plug members that are operative to direct objects to engage the seats. Further, although the term "ball" is used herein to refer to the seats disclosed herein, it is to be understood that the seats may be used in connection with another type of plug or plug member, such as a plug dart. All such configurations are deemed to be within the scope of the present disclosure and are deemed to be encompassed by the term "plug element."

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A seating apparatus, comprising:
a housing having a bore, and a seat member disposed within the bore, the seat member configured to receive a plug element, the seat member having a first position for receiving a plug element to restrict fluid flow through the bore and a second, radially expanded position in which the plug element passes through the seat member,
a portion of the seat member formed at least partially from a disintegrable material responsive to a selected fluid, wherein the portion of the seat member is substantially isolated from a portion of the bore when the seat member is in the first position, and the portion of the seat member is in communication with the selected fluid after the seat member radially expands to the second, radially expanded position.

2. The apparatus of claim 1, further comprising a chamber having a fluid activated support member operatively associated with the chamber and adapted to hold the seat member in the first position.

3. The apparatus of claim 1, the seat member being adapted to go from a first position to a second position by deformation.

4. The apparatus of claim 1, the housing being disposed in a well conduit.

5. The apparatus of claim 1, the plug element forming a ball.

6. The apparatus of claim 1, a second portion of the housing formed at least partially from a disintegrable material responsive to a selected fluid.

7. The apparatus of claim 1, the disintegrable material comprising a nanomatrix metal composite.

8. A method for restricting flow through a conduit disposed in a wellbore of a well, comprising:
   dropping a plug element into a well conduit, the plug element engaging a seat member located disposed in the well conduit;
   influencing the seat member to go from a first position, in which the seat member is engaged with the plug element, to a second, radially expanded position, allowing the plug element to pass through the seat member; and
   subjecting a second portion of the seat member to a selected fluid after the seat member goes to the second, radially expanded position, the second portion of the seat member being formed at least partially from a disintegrable material.

9. The method of claim 8, further comprising dropping the plug landing the plug element on a second seat member disposed in the well conduit.

10. The method of claim 8, the step of influencing the seat member to go from to the first position to the second position including subjecting the well conduit to a selected pressure.

11. A downhole system comprising:

a well conduit; and a selectively radially expandable seat member selectively supported in the well conduit, the selectively radially expandable seat member including a portion formed at least partially from a disintegrable material responsive to a selected fluid, wherein the portion of the seat member is substantially isolated from the well conduit when the seat member is in the first, radially compact position, and the portion of the seat member is in communication with the selected fluid after the seat member radially expands to a second, radially expanded position.

12. The downhole system according to claim 11, wherein the disintegrable material comprises a nanomatrix metal composite.

* * * * *